US007656639B2

(12) United States Patent
Woodworth et al.

(10) Patent No.: US 7,656,639 B2
(45) Date of Patent: Feb. 2, 2010

(54) RETAINER FOR SURGE ARRESTER DISCONNECTOR

(75) Inventors: Jonathan Jay Woodworth, Olean, NY (US); David Richard Miller, Allegany, NY (US); Michael Mahlon Ramarge, Olean, NY (US)

(73) Assignee: Cooper Technologies Company, Houston, TX (US)

( * ) Notice: Subject to any disclaimer, the term of this patent is extended or adjusted under 35 U.S.C. 154(b) by 505 days.

(21) Appl. No.: 11/518,657

(22) Filed: Sep. 11, 2006

(65) Prior Publication Data

US 2007/0297114 A1 Dec. 27, 2007

Related U.S. Application Data

(60) Provisional application No. 60/815,798, filed on Jun. 22, 2006.

(51) Int. Cl.
*H02H 9/00* (2006.01)

(52) U.S. Cl. ........................................................ 361/127

(58) Field of Classification Search .................. 361/127
See application file for complete search history.

(56) References Cited

U.S. PATENT DOCUMENTS 4,320,432 A * 3/1982 Duenke ........................ 361/39
4,404,614 A 9/1983 Koch et al.
4,663,692 A 5/1987 Carothers et al.
4,930,039 A 5/1990 Woodworth et al.
4,975,797 A 12/1990 Veverka et al.
5,113,167 A * 5/1992 Raudabaugh ................ 337/30
5,113,306 A 5/1992 Veverka et al.
5,594,613 A 1/1997 Woodworth et al.
5,708,555 A 1/1998 Woodworth et al.
6,231,404 B1 5/2001 Lichy
6,847,514 B2 1/2005 Ramarge et al.
7,301,096 B2 11/2007 Woodworth et al.
2007/0297114 A1 12/2007 Woodworth et al.
2008/0068122 A1 3/2008 Lenk et al.

OTHER PUBLICATIONS

U.S. Appl. No. 11/925,194, Woodworth et al.
Surge Arresters UltraSil™ Housed VariSTAR® Surge Arresters 5 kA and 1 kA IEC 60099-4 (IEC 99-4) for MV Systems to 36 kV; Electrical Apparatus 1235-35; Supersedes Oct. 2005; Jan. 2006; pp. 1-16; Cooper Power Systems.
Surge Arresters UltraSil™ Housed VariSTAR® Surge Arresters 10 kA Class 2—IEC 60099-4 for MV Systems to 30 kV Installation and Service Instructions; Service Information IS235-39-1; Apr. 2003; pp. 1-2; Cooper Power Systems.
ABB POLIM Surge Arrester Family: The Answer to Overvoltage Protection Problems in MV Systems; 6 pages from INMR Quarterly Review Website; Nov./Dec. 2002; vol. 10, No. 6; INMR Quarterly Review.

* cited by examiner

*Primary Examiner*—Stephen W Jackson
(74) *Attorney, Agent, or Firm*—King & Spalding LLP

(57) ABSTRACT

Retainers for movable surge arrester disconnectors to prevent relative displacement of the disconnectors with respect to the arrester within predetermined limits.

40 Claims, 10 Drawing Sheets

RETAINER FOR SURGE ARRESTER DISCONNECTOR

CROSS REFERENCE TO RELATED APPLICATIONS

This application claims the benefit of U.S. Provisional Application Ser. No. 60/815,798 filed Jun. 22, 2006, the disclosure of which is hereby incorporated by reference in its entirety.

BACKGROUND OF THE INVENTION

This invention relates generally to high voltage electrical power generation and transmission systems, and more specifically to high voltage surge arresters.

A surge arrester is a protective device that is commonly connected in parallel with a comparatively expensive piece of electrical equipment so as to shunt or divert over-voltage-induced current surges safely around the equipment, thereby protecting the equipment and its internal circuitry from damage. When exposed to an over-voltage condition, the surge arrester operates in a low impedance mode that provides a current path to electrical ground having a relatively low impedance. The surge arrester otherwise operates in a high impedance mode that provides a current path to ground having a relatively high impedance. The impedance of the current path is substantially lower than the impedance of the equipment being protected by the surge arrester when the surge arrester is operating in the low-impedance mode, and is otherwise substantially higher than the impedance of the protected equipment. Upon completion of the over-voltage condition, the surge arrester returns to operation in the high impedance mode. This prevents normal current at the system frequency from following the surge current to ground along the current path through the surge arrester.

DETAILED DESCRIPTION OF THE INVENTION

In order to appreciate the benefits of the invention to its full extent, the disclosure herein will be segmented into different parts. Part I discusses known high voltage surge arresters and problems associated therewith. Part II discusses exemplary embodiments of improved surge connector assemblies. Part III discusses methods associated with the exemplary embodiments of Part II.

I. Introduction to the Invention

Electrical power transmission and distribution equipment is subject to voltages within a fairly narrow range under normal operating conditions, and the equipment may operate at high voltages of, for example, 1000V or greater. However, system disturbances, such as lightning strikes and switching surges, may produce momentary or extended voltage levels that greatly exceed the levels experienced by the equipment during normal operating conditions. These voltage variations often are referred to as over-voltage conditions. If not protected from over-voltage conditions, critical and expensive equipment, such as transformers, switching devices, computer equipment, and electrical machinery, may be damaged or destroyed by over-voltage conditions and associated current surges. Accordingly, it is routine practice for system designers to use surge arresters to protect system components from dangerous over-voltage conditions.

As mentioned previously, surge arresters are commonly connected in parallel with a comparatively expensive piece of electrical equipment. While the surge arresters normally exhibit a high impedance, when an over-voltage event occurs the surge arresters switch to a low impedance state so as to shunt or divert over-voltage-induced current to electrical ground. Damaging currents are therefore diverted safely around the equipment, thereby protecting the equipment and its internal circuitry from damage.

Figure 1:
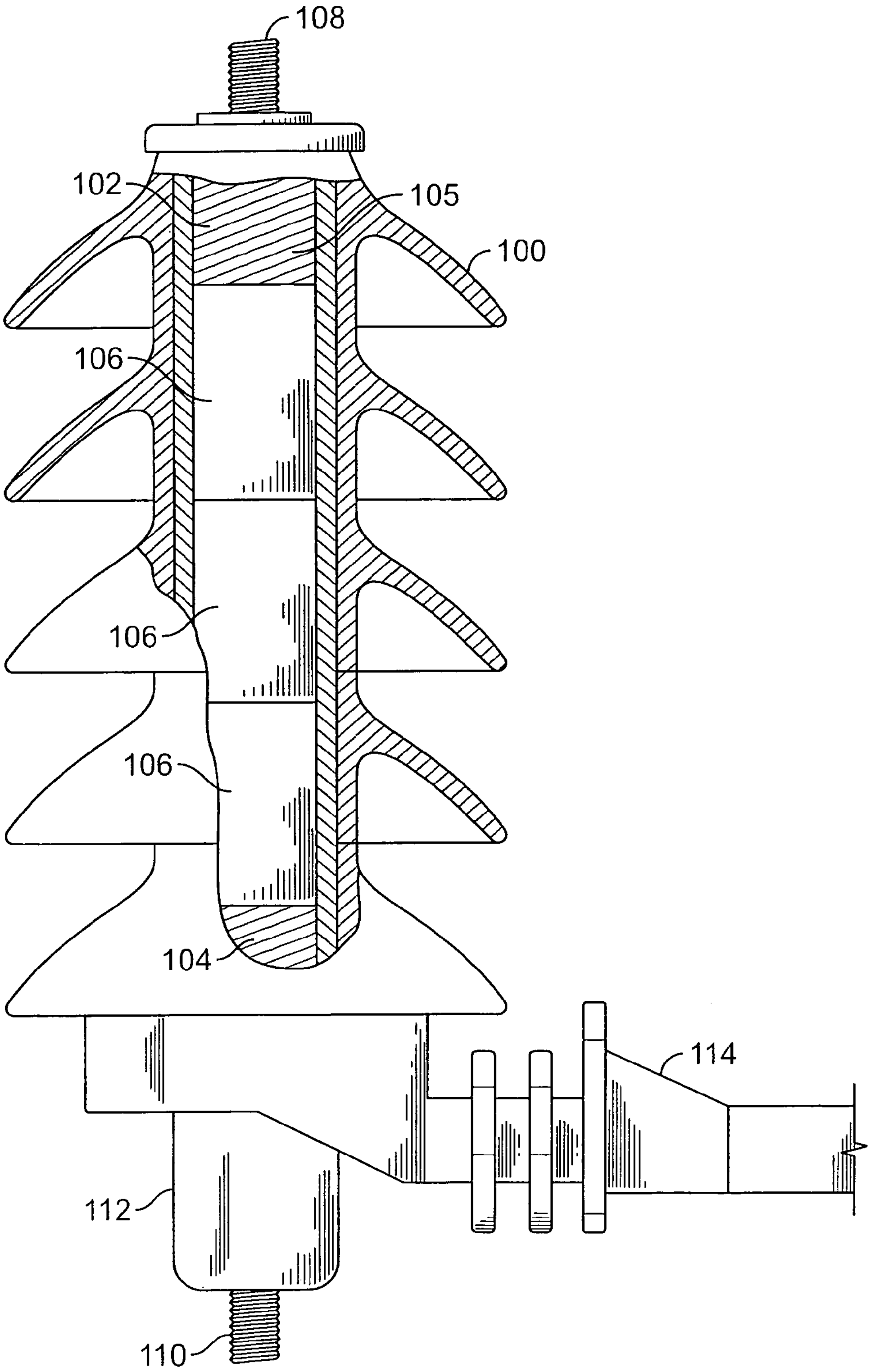
FIG. 1 (Prior Art)
FIG. 1 is a partial cross sectional view of a known high voltage surge arrester.

As illustrated in FIG. 1, a high voltage surge arrester 90 typically includes an elongated outer enclosure or housing 100 made of an electrically insulating material, a pair of electrical terminals 102, 104 at opposite ends of the enclosure 100 for connecting the arrester between a line-potential conductor and electrical ground, respectively and a stack or array 105 of other electrical components 106 that form a series electrical path between the terminals 102 and 104. Terminal studs 108, 110 connect to the line and ground terminals 102 and 104, respectively.

The components 106 typically include a stack of voltage-dependent, nonlinear resistive elements, referred to as varistors. A varistor is characterized by having a relatively high resistance when exposed to a normal operating voltage, and a much lower resistance when exposed to a larger voltage, such as is associated with over-voltage conditions. The varistors may be, for example, metal oxide varistors. In addition to varistors, one or more spark gap assemblies may be housed within the insulative enclosure 100 and electrically connected in series with the varistors. Also, in addition to the varistor elements, such components including, for example, resistors, capacitors, insulators and fuse links may be provided in the stack or array 105. Some arresters also include electrically conductive spacer elements coaxially aligned with the varistors and gap assemblies. An insulated mounting bracket or hanger 114, may also be provided for mounting of the arrester 90 to, for example, another piece of equipment or to a utility pole.

To prevent short circuiting of line potential conductors connected to the surge arrester 90, an isolator or disconnector 112 is provided on the ground terminal stud 110. In accordance with known disconnectors, the disconnector 112 may include a internal resistor connected in parallel with a spark gap assembly, and a charged black powder in an unprimed 22 caliber cartridge that is heat activated. Thus, if the arrester 90 were to fail and a sustained current flows through the terminal stud 110, a spark is generated by the spark gap assembly. Heat from the spark detonates the charged powder to mechanically sever electrical connection between the terminal stud 110 and the lower terminal 104 in the housing, thereby isolating the terminal stud 110 from the line connection. Short circuit conditions through the arrester 90 may therefore be prevented.

Undesirably, it has been discovered that portions of the heat sensitive disconnectors 112 can become a projectile when the disconnector cartridge is inadvertently exposed to heat during shipping, transit, and storage. When being transported in vehicles, if an accident were to result in fire proximate one or more arresters, activation of the disconnectors in the vehicle can be hazardous. Additionally, when arresters in a storage facility are subjected to fire in the storage facility, the disconnectors may be activated. Projectiles attributable to detonation of the disconnectors in such circumstances are of particular concern, particularly when a large number of arresters with such disconnectors are shipped and stored together.

While the disconnector 112 has so far been described and illustrated in connection with a particular type of high voltage surge arrester 90 that is believed to be representative of typical surge arresters, it is to be understood that a variety of different types of known surge arresters include such disconnectors, all of which are vulnerable to the hazards noted above. Additionally, similar problems may be experienced by all disconnector devices. The problems noted above are therefore not considered unique to any particular disconnector, such as the disconnector 112, or to any particular surge arrester, such as the arrester 90.

II. Exemplary Embodiments of the Invention

The invention provides a means for safely retaining portions of disconnectors, including but not limited to charged powder disconnectors, that can become detached from the main body of a disconnector when subjected to sufficient temperature associated with, for example, a fire during transport or storage. More specifically, a variety of retainer structures are described herein that are configured to retain a bottom portion of the disconnector in a location proximate to the arrester if it should be activated by heat during transportation or storage. In other words, by virtue of the inventive retainer structures of the invention, movable portions of the disconnector are constrained to a limited amount of displacement relative to the arrester and are positively prevented from becoming a significant projectile or presenting significant danger when the retainers are installed. As will become evident below, wires, straps and/or wireforms may be utilized to retain disconnectors in place relative to surge arresters. By virtue of the retainer devices explained hereinbelow, arresters having disconnectors may be shipped as unclassified or non-hazardous products per applicable Department of Transportation Guidelines.

Figure 2:
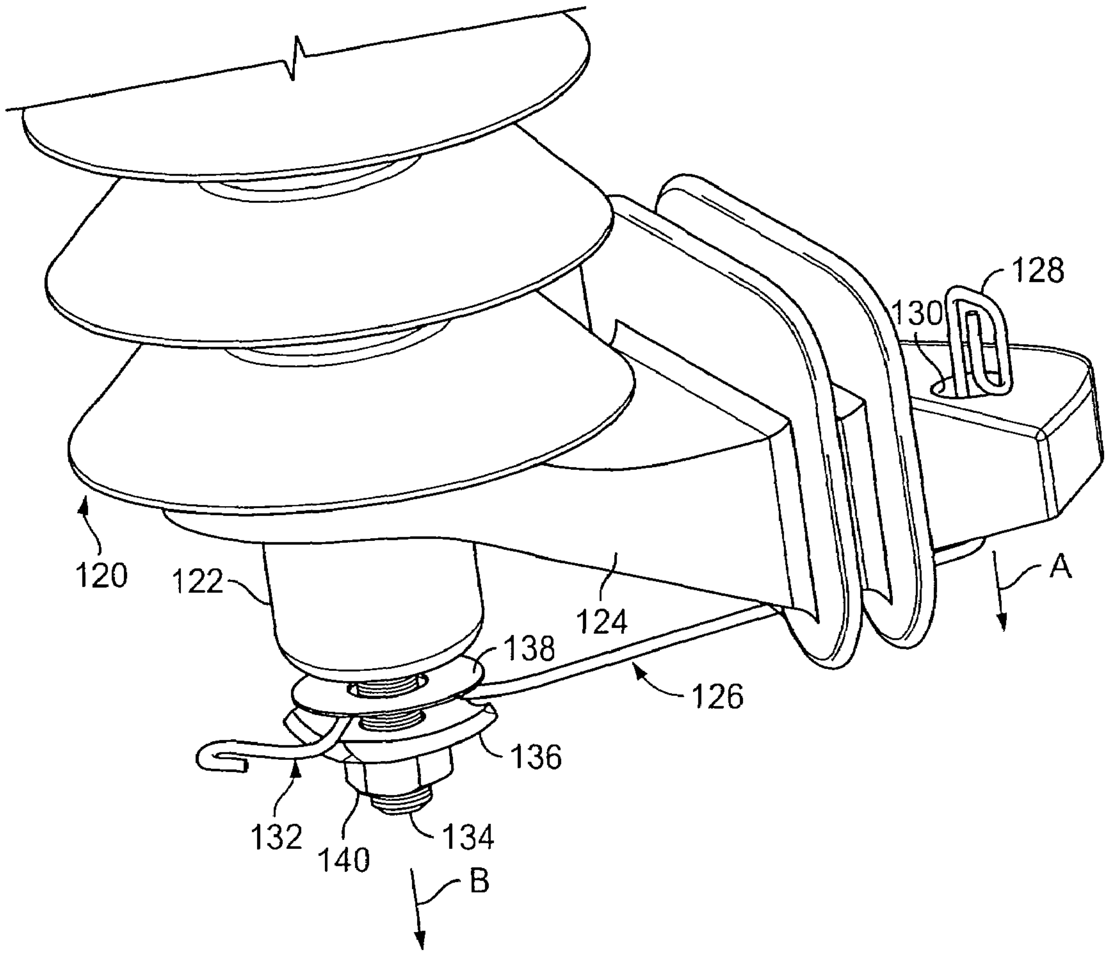
FIG. 2 is a side elevational view a surge arrester with a disconnector retainer according to the present invention.

FIG. 2 is a side elevational view a high voltage surge arrester 120 having a disconnector 122 and a mounting bracket or hanger 124, and a retainer 126 formed in accordance with an exemplary embodiment of the invention. The arrester 120 and disconnector 122 may be similar to the arrester 90 and disconnector 112 described above.

As shown in FIG. 2, the retainer 126 includes a hanger portion 128 extending through a mounting aperture or hole 130 in the bracket or hanger 124, and a disconnector portion 132 engaging a terminal stud 134 of the arrester 120 adjacent the disconnector 122. The disconnector portion 132 of the hanger is flanked with a pressure plate 136 and a washer 138, and a nut 140 engages the threaded stud 134. The hanger portion 128 is shaped to resist being pulled through the hanger 124 in the direction of arrow A and hence the retainer 126 is not easily separated from the hanger 124. As such, when the disconnector 122 is activated, axial movement of the disconnector in the direction of Arrow B is limited by the disconnector portion 132 of the hanger 126 and is prevented from becoming a hazardous projectile.

Figure 3:
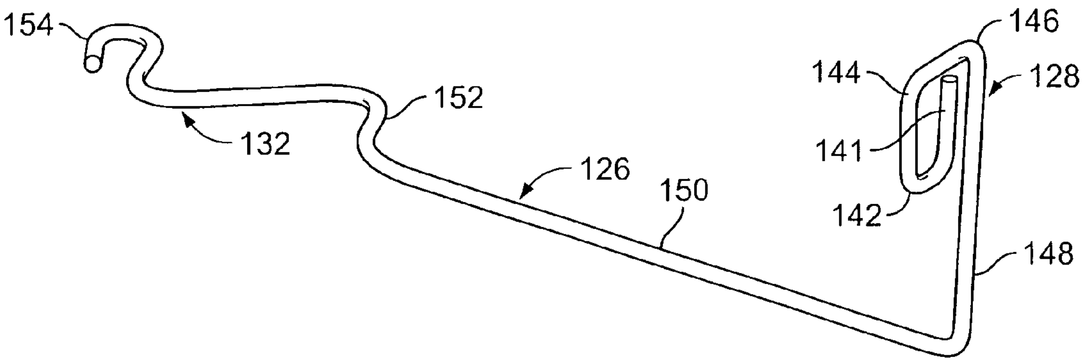
FIG. 3 is a perspective view of the retainer shown in FIG. 2 removed from the surge arrester.

FIG. 3 is a perspective view of the retainer 126 removed from the surge arrester 120 (FIG. 2). In the illustrated embodiment, the retainer 126 is fabricated from a length of small gauge, low temper wire having a diameter of about 0.25 inches in diameter. The wire is relatively stiff and rigid yet amenable to being shaped or formed into the exemplary configuration shown in FIG. 3.

As shown in FIG. 3, a first end 141 of the retainer 126 may be bent upon itself into a U-shaped portion 142 having a right angle bend 144 over the top of the U-shaped portion 142. The U-shaped portion 142 prevents user contact with burrs in the metal at the first end 141.

Another right angle bend 146 is formed at a distance from the bend 144 that is larger, for example, than the aperture 130 (FIG. 2) in the hanger 124 (also shown in FIG. 2). The U-shaped portion 142 and the bends 144 and 146 form a head in a vertical plane that is not easily passed through the hanger aperture 130, while substantially minimizing the length of wire needed to form the head.

A vertical leg 148 may extend from the bend 146 for a sufficient distance to pass through the hanger aperture 130 and align the disconnector portion 132 with the terminal stud 134 as shown in FIG. 2. The length of the vertical leg 148 may be selected to accommodate dimensions of surge arresters that are commercially available from different manufacturers, including but not limited to Cooper Power Systems of Waukesha, Wis. and Joslyn Electronic Systems of Goleta, Calif.

A substantially horizontal leg 150 extends from the vertical leg 148, and the horizontal leg 150 extends for an axial distance to accommodate a corresponding length between, for example, the hanger aperture 130 and the terminal stud 134 of the arrester 120 to place the disconnector portion 132 around the stud 134. The length of the horizontal leg 150 may be selected to accommodate dimensions of various types of arrester hangers, including but not limited to the hanger 124 shown in FIG. 2.

The disconnector portion 132 in an exemplary embodiment extends from an end of the horizontal leg 150 opposite the vertical leg 148, and the disconnector portion is curved in the horizontal plane of the horizontal leg 150 forming a substantially V-shaped segment 152 in the retainer 126. The radius of curvature in the disconnector portion 132 is selected to ease installation of the retainer 126 to the terminal stud 110, and for optimal nesting and retention of the disconnector portion 132 to the stud 110 with minimal tightening of the nut 140 (FIG. 2).

A second end 154 of the retainer 126 is bent in a hook shape adjacent the disconnector portion 132 to eliminate user contact with burrs in the metal.

In the embodiment shown in FIG. 2, the retainer may be formed in a generally low cost and, straightforward manner by forming the disconnector portion 132 and the horizontal leg 150 in a horizontal plane and forming the vertical leg 148, the bends 144 and 146 and the U-shaped portion 142 in a vertical plane. Additionally, the wire form retainer 126 may be produced with little or no scrap metal being generated. While one particular shape of the retainer 126 is illustrated in FIG. 3, it is understood that the retainer may include additional or alternative bends, angles, and segments in further and/or alternative embodiments of the invention.

Figure 4:
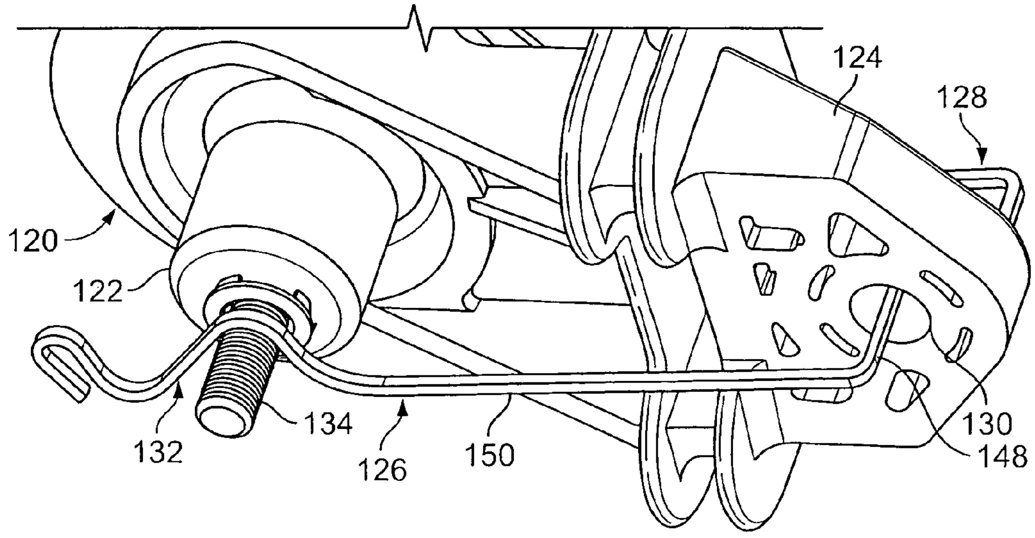
FIG. 4 is a bottom perspective view of the arrester and retainer shown in FIG. 2.

FIG. 4 illustrates the retainer 126 coupled to the arrester 120. The disconnector portion 132 is nested around the terminal stud 134 beneath the disconnector 122. The vertical leg 148 is extended through the hanger aperture 130 with the hanger portion 128 extending above the hanger 124 and the horizontal leg 150 extending below the hanger 124. In this position, the nut 140 (FIG. 2) may be coupled to the stud 134 to ensure that the bottom portion of the disconnector 122 does not separate from the arrester 90 and become a hazardous projectile.

The wire form retainer 126 provides a cost effective means of constraining the disconnector 122, and is readily adaptable to different types of surge arresters. The retainer 126 is easy to install or uninstall, and can be used on surge arresters of various ratings and different arresters or various manufacturers. The retainer 126 may be factory installed at a packing stage of an arrester, or alternatively may be retrofitted to surge arresters. The retainer may be used and installed by line personnel, and may be reusable.

In further embodiments, the retainer 126 may be configured so that it does not need to be uninstalled form an arrester prior to making an electrical connection to ground. The retainer 126 may additionally provide an end user with a ready means for making a ground connection to the surge arrester at the point of installation.

Figure 5A:
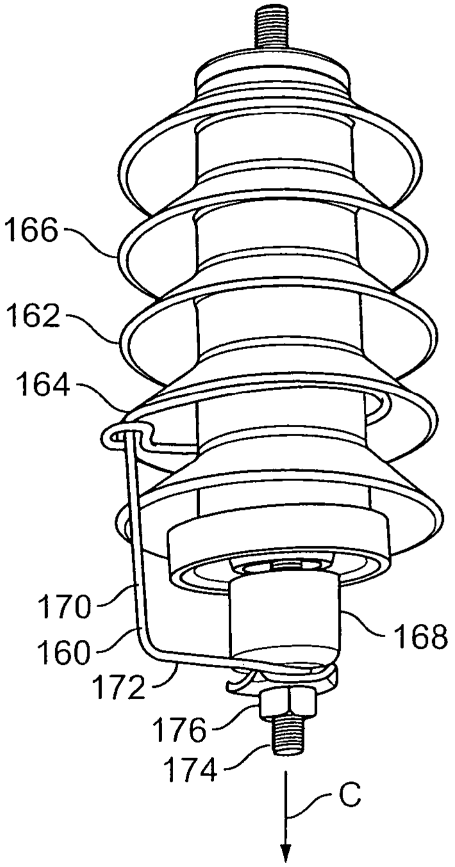
FIG. 5A illustrates a second embodiment of a disconnector retainer coupled to a surge arrester.

FIG. 5A illustrates a second embodiment of a disconnector retainer 160 coupled to a surge arrester 162 that may be similar to the arrester 90 shown in FIG. 1, but without the arrester hanger 124. Like the retainer 126 shown in FIGS. 2-4, the retainer 160 may be fabricated from a length of small gauge, low temper wire. Instead of the hanger portion 128, however, the retainer 160 includes a housing portion 164 that is wrapped or bent around a portion of the housing 166 of the arrester 162. An inner periphery of the housing portion 164, however, is larger than a minimum outer dimension of the housing 166 but less than a maximum outer periphery of the housing 166, wherein any movement of the housing portion 164 along the axis of the arrester 162 is possible only to a limited extent. At some point, the housing portion 164 will interfere with the arrester housing 166 and prevent further movement of the retainer 160 as the housing portion 164 is moved downward and away from the arrester 162 in the direction of Arrow C.

As shown in FIG. 5A, the retainer 160 may also include a substantially vertical leg 170 and a substantially horizontal leg that engages a terminal stud 174 of the arrester 162. A nut 176 may be provided to secure the horizontal leg 172 to the disconnector 168. When the disconnector 168 is activated, axial movement of the disconnector 168 in the direction of Arrow C is limited by the housing portion 164 of the retainer 160, and the disconnector 168 is accordingly prevented from becoming a hazardous projectile.

Figure 5B:
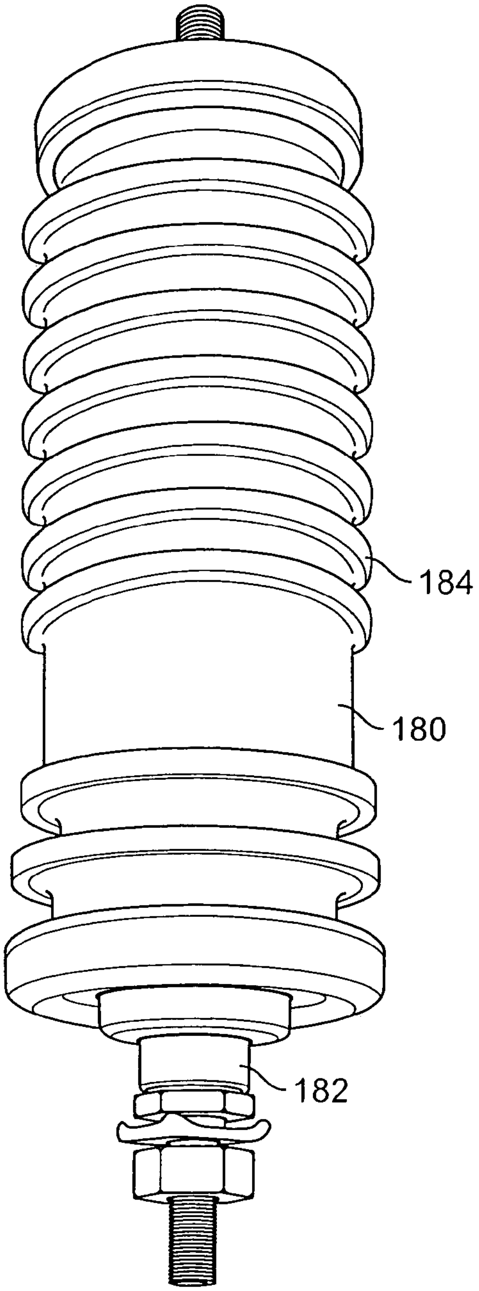
FIG. 5B illustrates an alternative surge arrester that may be used with the retainer shown in FIG. 5A.

While one particular shape of the retainer 160 is illustrated in FIG. 5A, it is understood that the retainer may include additional or alternative bends, angles, and segments in further and/or alternative embodiments of the invention. As one example of the versatility of the invention, the retainer 160 could alternatively be used, as shown in FIG. 5B, with the arrester 180 and disconnector 182 to constrain the disconnector 182 and prevent it from becoming a hazardous projectile, despite the differently shaped housing 184 of the arrester 180 versus the arrester 162 of FIG. 5A.

Figure 6A:
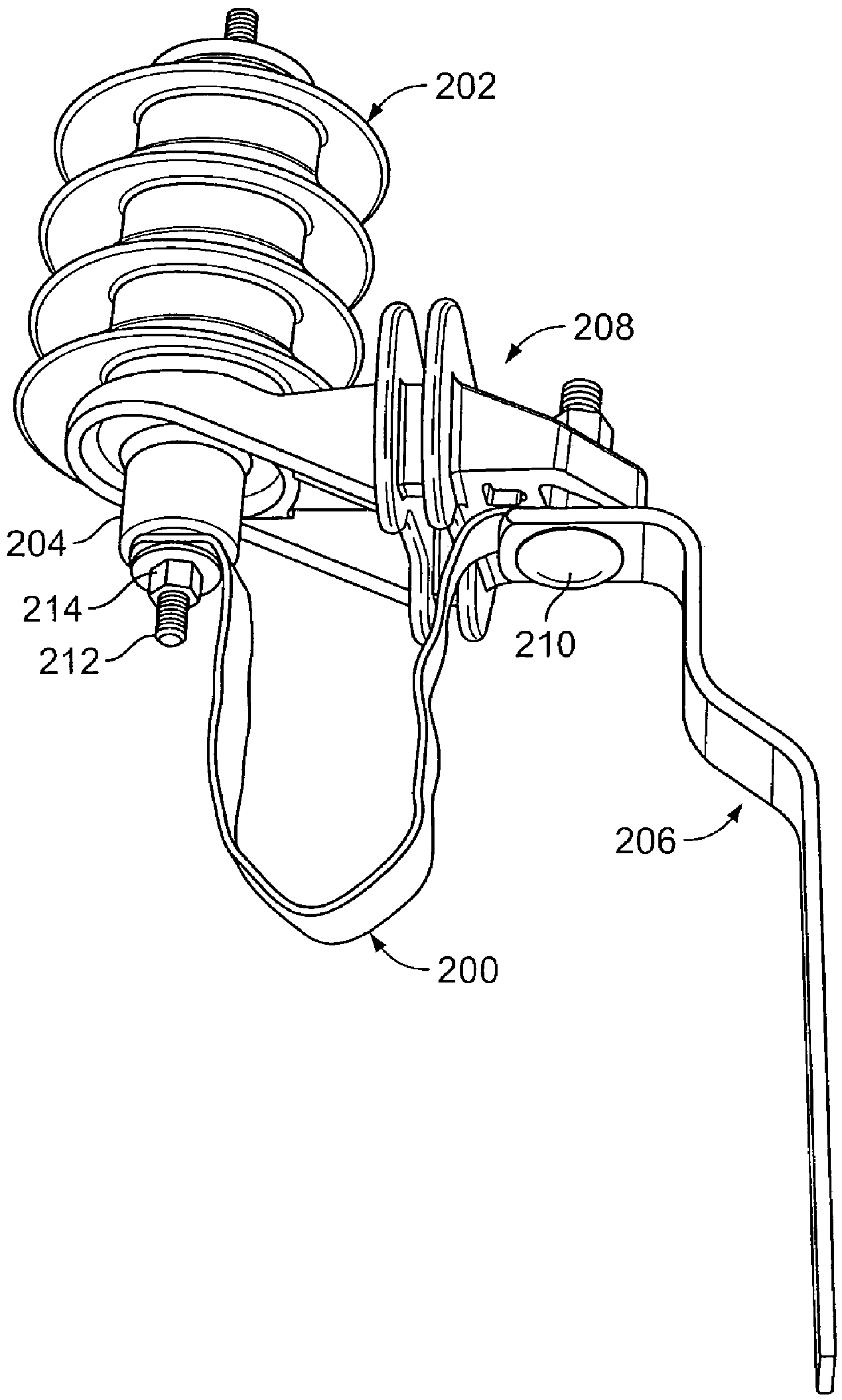
FIG. 6A illustrates a third embodiment of a disconnector retainer coupled to a surge arrester.

FIG. 6A illustrates a third embodiment of a disconnector retainer 200 coupled to a surge arrester 202 having a disconnector 204 and a bracket 206 coupled to an arrester hanger 208. The retainer 200 may be fabricated from a flexible strap of material. One end of the strap may fastened be secured to the hanger 208 and bracket 206 with a bolt 210, and an opposing end of the strap may be fastened or secured to a terminal stud 212 with a nut 214. Because one end of the strap is secured to the disconnector 204 and the other end is fixed to the hanger 208, displacement of the disconnector 204 when actuated is limited to the length of the strap retainer 200. In other words, the disconnector 204 may only become a projectile for a short distance that is limited by the strap retainer 200. By selecting the distance to be appropriately short, any projectile behavior of the disconnector will not present a significant hazard.

Figure 6B:
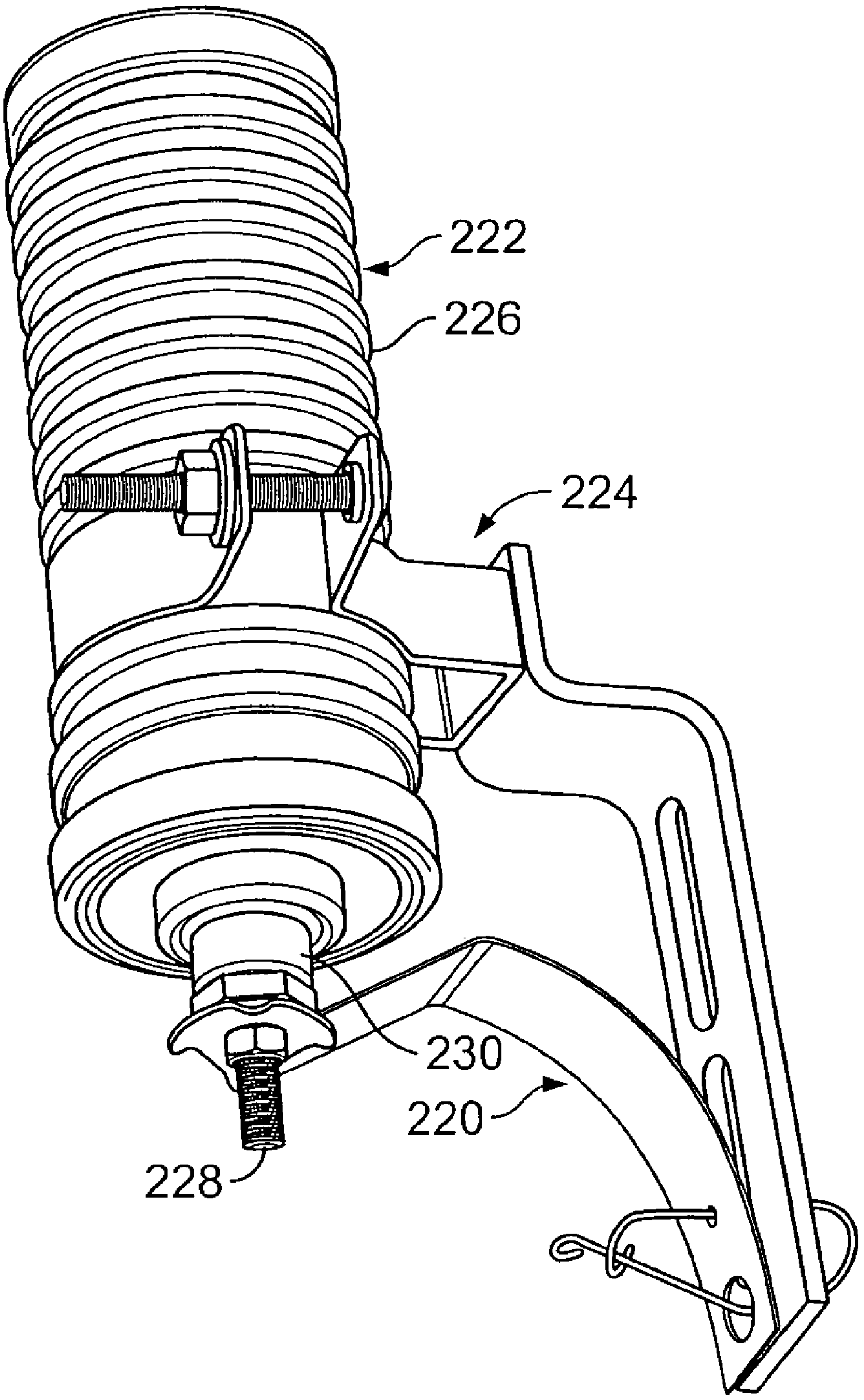
FIG. 6B illustrates an alternative disconnector retainer and surge arrester that that of FIG. 6A.

FIG. 6B illustrates a strap retainer 220 for a surge arrester 222 with a hanger bracket 224 coupled over a housing 226 of the arrester 222. The strap retainer 220 is secured to the hanger bracket 224 on one end and to a terminal stud 228 of the arrester 222 on the opposing end. Like the retainer 200 shown in FIG. 6A, the retainer 220 constrains the displacement of the disconnector 230 when activated to a predetermined amount equal to the length of the strap retainer 220. The disconnector 230 may only become a projectile for a short distance that is limited by the strap retainer 220, thereby preventing significant hazard from occurring when the disconnector 230 operates.

Figure 7:
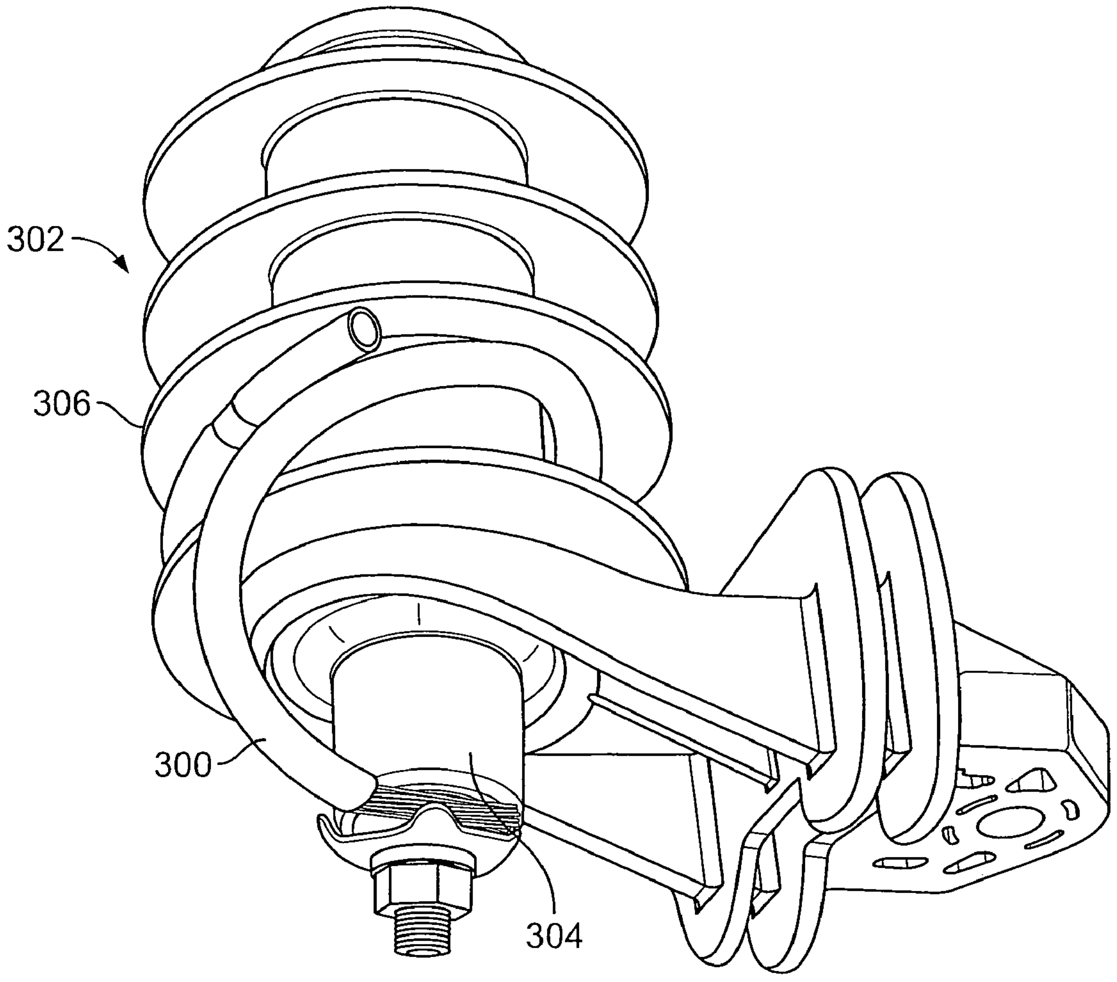
FIG. 7 illustrates a fourth embodiment of a disconnector retainer coupled to a surge arrester.

FIG. 7 illustrates a fourth embodiment of a disconnector retainer 300 coupled to a surge arrester 302. The retainer 300 may be a flexible tubular element, such as an insulated or uninsulated wire conductor, that is mechanically secured to a disconnector 304 of the surge arrester 302 on one end, and wrapped around a housing 306 of the surge arrester 302 at the opposing end. In various embodiments, portions retainer 300 wrapped around the arrester housing may be secured to one another so as to interfere with the arrester housing and frustrate separation of the retainer 306 from the arrester housing, a portion of the retainer 300 may be clamped or otherwise fastened to the arrester housing, or the retainer 300 may simply be wrapped around the arrester housing a sufficient number of times to render separation of the arrester 203 and retainer 300 unlikely. In any event, the tubular retainer 300 interferes with the arrester housing 306 and prevents displacement of the disconnector 304 beyond a predetermined amount within close proximity to the arrester 302, thereby preventing the disconnector 304 from becoming a dangerous projectile.

Figure 8:
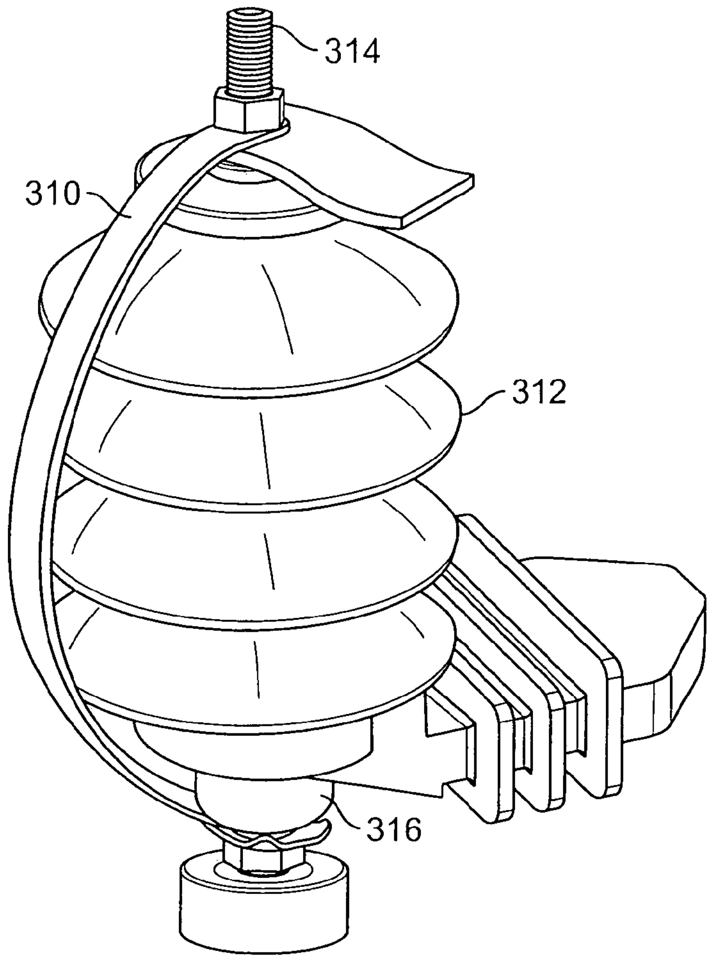
FIG. 8 illustrates a fifth embodiment of a disconnector retainer coupled to a surge arrester.

FIG. 8 illustrates a fifth embodiment of a disconnector retainer 310 coupled to a surge arrester 312. The retainer 310 is fabricated from a flexible strip of material and is mechanically connected to a line terminal stud 314 on end and to the disconnector 316 on the opposing end of the retainer 310. The retainer 310 maintains the disconnector 316 in close proximity to the arrester 312 if the disconnector 316 is activated. The disconnector 316 is therefore prevented from becoming a dangerous projectile.

Figure 9:
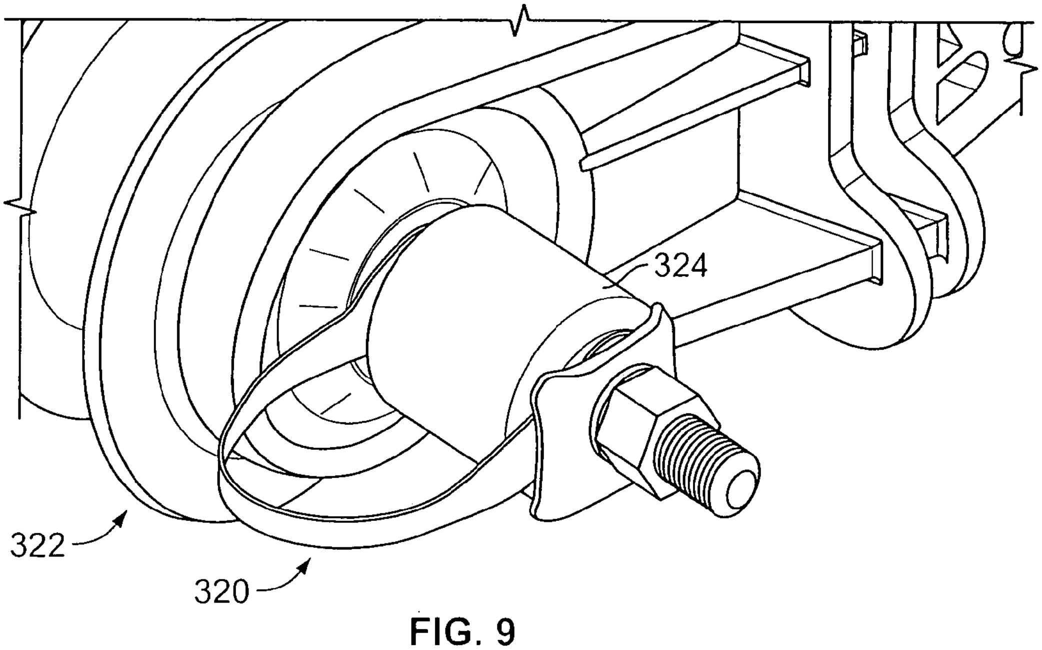
FIG. 9 illustrates a sixth embodiment of a disconnector retainer coupled to a surge arrester.

FIG. 9 illustrates a sixth embodiment of a disconnector retainer 320 coupled to a surge arrester 322 adjacent a disconnector 324 of the arrester 322. The retainer 320 is fabricated from a strip of material, and each of the opposing ends of the strip is fastened to one end of the disconnector 324. Displacement of a bottom portion of the disconnector 320 is constrained to the length of the strap retainer 320.

Figure 10A:
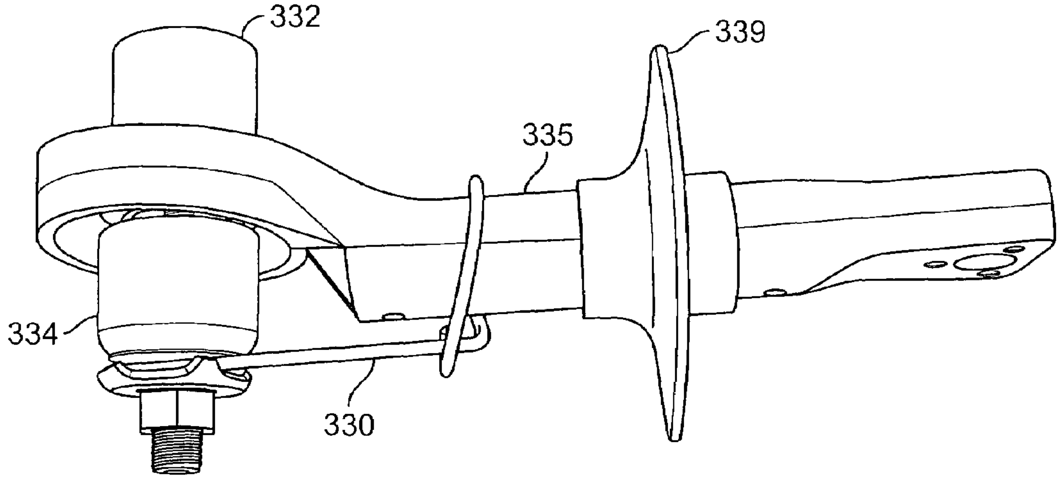
FIG. 10A illustrates a seventh embodiment of a disconnect retainer coupler to a surge arrester.
Figure 10B:
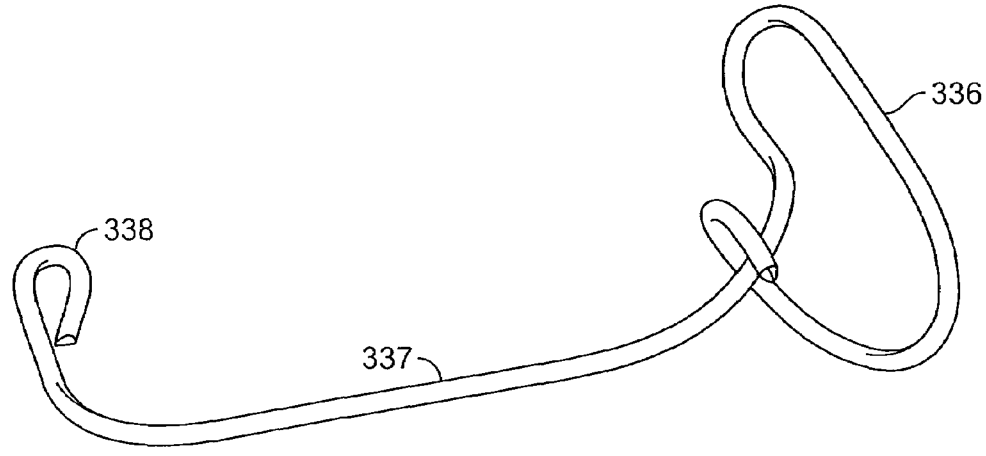
FIG. 10B illustrates the retainer shown in FIG. 10A removed from the surge arrester.

FIG. 10 illustrates a seventh embodiment of a disconnector retainer 330 coupled to a surge arrester 332 and retaining a disconnector 334 to constrain relative movement of portions of the disconnector 334 as it operates. A hanger 335 is coupled to the arrester 332 for mounting the arrester 332 in a desired location. The disconnector 334 in an exemplary embodiment may be formed from a rigid material or wire similar to the disconnector 126 shown in FIG. 2 but being bent or otherwise formed into an alternative shape. More specifically, the retainer 330 may be formed to include a hanger portion 336, a substantially straight extension portion 337, and a disconnector portion 338. The hanger portion 336 is extended around and receives a portion of the hanger 335. The retainer 330 also includes a disconnector portion 338 that may be nested around a terminal stud (FIG. 10A) of the arrester 332. The hanger 335 may include a stop plate 339 that prevents the hanger portion 336 from separating from the hanger 336. Displacement of a bottom portion of the disconnector 334 is therefore constrained.

FIGS. 2-10 are believed to amply demonstrate the versatility of the invention for use with different types of surge arresters. However, the invention is equally versatile for use with different types of disconnectors. In particular, it is understood that arresters exist having disconnector on the line side of the arrester, as opposed to the illustrated embodiments with the disconnectors on the ground side of the arrester. The retainers of the invention, however, may be used equally with line-side disconnectors.

Figure 11A:
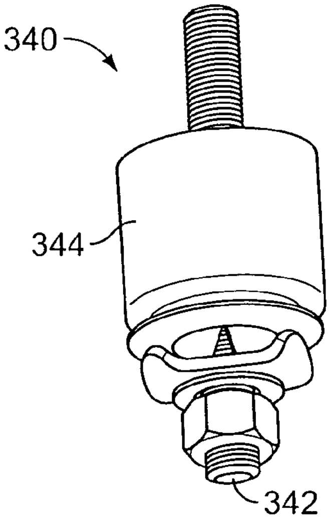
FIG. 11A illustrates a conventional disconnector assembly that may be used with surge arresters and the retainers shown in FIGS. 2-9.

FIG. 11A illustrates a first disconnector assembly 340 that may be used with a surge arrester. A ground lead may be coupled to the lower stud terminal 342 of the disconnector 344. The retainers described above may be connected the lower terminal 342 such as, for example, in any manner illustrated in FIGS. 2-9.

Figure 11B:
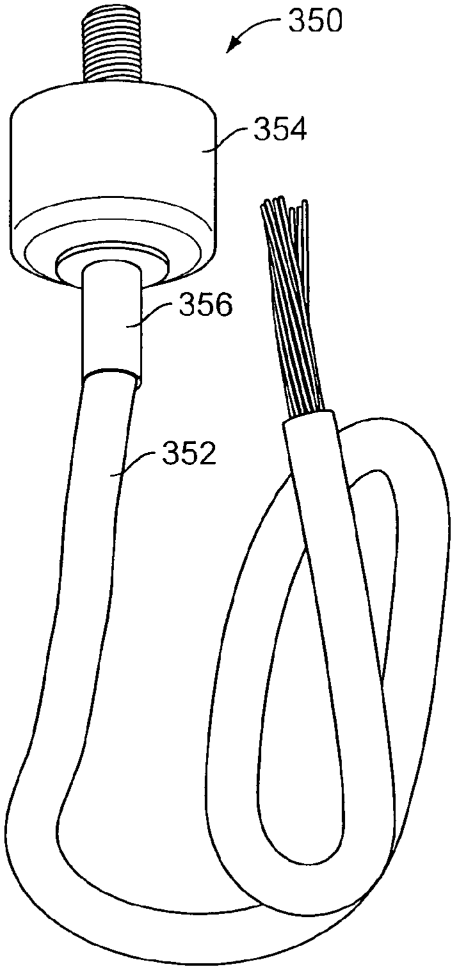
FIG. 11B illustrates another conventional disconnector assembly that may be used retained to a surge arrester in accordance with an embodiment of the invention.

FIG. 11B illustrates a second disconnector assembly 350 with a pre-attached line lead 352 on one end of a disconnector 354. The lead 352 may serve as a disconnect retainer when wrapped around an arrester housing for purposes of shipping, transit and storage. The attached lead 352 in such a configuration would resemble the embodiment illustrated in FIG. 7.

Alternatively, the retainers described above may be utilized with the assembly 350. With such an assembly 350, retainers such as those described above could be coupled to a ferrule 356 of the lead 352 that meets the disconnector 354. Installation of the retainers may involve threading the lead 352 through an end of the retainer.

III. Inventive Methods

Having now described the structure and function of various embodiments of retainers to limit displacement of disconnectors for high voltage arresters, the benefits of the invention may also be appreciated in the following methods.

Figure 12:
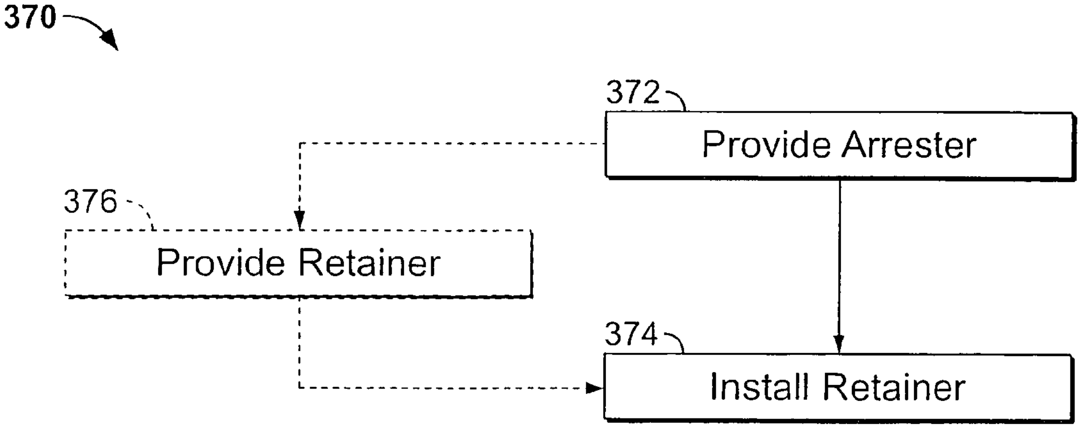
FIG. 12 illustrates a method of packing high voltage arresters in accordance with an exemplary embodiment of the invention.

A method 370 of packaging a high voltage surge arrester for storage or transport is shown in FIG. 12. The method includes providing 372 a high voltage arrester having a disconnector, and installing 374 a retainer to the arrester, wherein the retainer is configured to prevent displacement of a portion of a disconnector beyond a predetermined amount. The disconnectors may be provided on a line side terminal or on a ground side terminal of the arrester. The installed retainer may be, for example, any of the previously described retainers. The installation of the retainer may be performed at a packaging site, a manufacturing or distribution facility for high voltage arresters, or by an end user. As such, retainers may be installed as original equipment or may be retrofitted to existing surge arresters.

Installation of the retainer may include providing 376 a retainer having opposite ends, and securing one end to the disconnector with the other end of the retainer interfering with a portion of the arrester or an insulated mounting bracket or hanger connected to the arrester. Alternatively, the retainer may be positively secured to portions of the arrester, such as opposing terminal studs thereof, on each end of the retainer. In still another alternative embodiment, the retainer may be fastened or otherwise secured, such as with threaded fasteners, to the arrester on one end and to an arrester hanger or bracket on another end. In yet another embodiment, the retainer may be fastened to opposing ends of the disconnector at each respective end of the retainer. The retainer may also be wrapped around the body of the retainer. Combinations of such securing techniques may also be utilized as desired.

Retainers may be provided in kit form for use by the end user, and a variety of different retainers may be provided in the kit to meet needs of different types of arresters encountered in installation and/or maintenance tasks. The retainers may be installed for storage and transport, and may be uninstalled when arresters are to be connected to line conductors and ground conductors in the field. The retainers are reusable and may be uninstalled and reinstalled on the same or different arrester.

IV. Conclusion

Various embodiments of inventive retainer structures are disclosed herein that prevent disconnectors from presenting significant danger and hazard when the disconnectors are coupled to high voltage surge arresters and the disconnectors are inadvertently or unintentionally operated during shipping, handling, transit and storage of the arresters. One such inadvertent operation of disconnectors may result when the arresters are exposed to fire, although other means of unintentional activation or operation of the disconnector may likewise be encountered. The retainers disclosed are advantageously used with bursting, charged powder disconnectors, although it is understood that the retainers may be equally applicable to other types of disconnectors or isolators for increased safety of such devices for shipping, transit, handling and storage purposes.

One embodiment of a surge arrester assembly is disclosed herein that comprises: a surge arrester; a disconnector coupled to the surge arrester; and a retainer coupled to the disconnector and configured to constrain displacement of the disconnector relative to the surge arrester.

Optionally, the retainer may be rigid, may be flexible, or may be tubular. A hanger may be coupled to the arrester, wherein the retainer extends between the hanger and the disconnector. The surge arrester may include a housing, with a portion of the retainer extending around the housing and interfering with the housing when the disconnector is activated. Alternatively, the retainer may be wrapped around the housing. The retainer may be coupled to opposing ends of the disconnector, or the surge arrester may include first and second terminal studs with the retainer extending between the first and second terminal studs. A terminal stud may extend from the disconnector, and the retainer may be fastened to the disconnector via the terminal stud. The surge arrester may include a stack of components responsive to an over-voltage condition to shunt current to electrical ground, the components including at least one metal oxide varistor. The disconnector may be detonated to mechanically sever an electrical connection to the surge arrester.

Another embodiment of a surge arrester assembly is also disclosed. The assembly comprises: a high voltage surge arrester comprising first and second terminals; a disconnector coupled to the surge arrester and configured to sever electrical connection to one of the terminals; and a retainer configured to limit axial displacement of the disconnector relative to the surge arrester.

Optionally, the disconnector may include a charged powder. A first terminal stud may extend from the first terminal and a second terminal stud may extend from the disconnector. The retainer may be coupled to each of the first and second terminal studs. The retainer may comprise a rigid wire form, and the wire form may include a section configured to nest around a terminal stud extending from the disconnector. The arrester may include a hanger defining an aperture therethrough, and the wire form may extend through the aperture, with the wire form having a hanger portion configured to resist being pulled through the aperture. The hanger portion may extend in a first plane, and a disconnector portion may extend in a second plane, wherein the first and second planes are different from one another. The first and second planes may be substantially perpendicular to one another. Alternatively, the wire form may comprise a housing portion extending around an outer periphery of the arrester, with the housing portion dimensioned to interfere with the periphery of the arrester and prevent movement of the disconnector away from the arrester when activated.

As another option/alternative, the retainer may comprise a flexible strap, with the strap being coupled to a first side of the disconnector. A hanger may extend from the arrester, and the strap may be coupled to the hanger and extending between the hanger and the disconnector. The disconnector may include a second side opposite the first side, with the strap being connected to the second side and extending between the first and second sides. In yet another option, the retainer may be wrapped around the arrester.

Still another embodiment of a surge arrester assembly id disclosed. The assembly comprises: a high voltage surge arrester defining a conductive path between first and second terminals, the current path exhibiting a high impedance during normal operating conditions and a low impedance during an over-voltage condition; a disconnector coupled to the surge arrester and comprising a charged powder configured to be detonated, thereby severing electrical connection to one of the first and second terminals; and a retainer configured to limit movement of the disconnector relative to the surge arrester and preventing the disconnector from becoming a hazardous projectile if the disconnector detonates during shipping and storage of the arrester.

Optionally, a first terminal stud may extend from the first terminal and a second terminal stud may extend from the disconnector, with the retainer coupled to at least one of the terminal studs. The retainer may be nested around one of the studs, and the retainer may be selected from the group of a wire form, a wire, and a strap. The retainer may be flexible. The arrester may include a hanger, and the retainer may be coupled to the hanger. The retainer may extend around an outer periphery of the arrester, and the retainer may be dimensioned to interfere with the periphery of the arrester and prevent movement of the disconnector away from the arrester when activated. The disconnector may include opposing sides, and the retainer may be coupled to the disconnector proximate each of the opposing sides. The retainer may be wrapped around the arrester.

An embodiment of a method of packaging a high voltage surge arrester for storage or transport is also disclosed. The method comprises providing a high voltage surge arrester defining a conductive path between first and second terminals, the current path exhibiting a high impedance during normal operating conditions and a low impedance during an over-voltage condition, the arrester including a disconnector adapted to break electrical connection through the arrester in a failure condition; providing a retainer adapted to limit displacement of the disconnector relative to the arrester; and installing the retainer to the disconnector, whereby the disconnector is prevented from becoming a hazardous projectile during transit and storage.

Optionally, installing the retainer may be performed at one of a packing site, a manufacturing or distributing facility, or at the site of installation of the arrester to a high voltage electrical power system. Installing the retainer may comprise retrofitting an arrester with the retainer. Providing the retainer may comprises providing a plurality of differently configured retainers.

An embodiment of a high voltage arrester assembly is disclosed. The assembly includes means for providing over-voltage protection to a high voltage electrical system. The means for providing establishes a current path to electrical ground in an over-voltage condition, and the current path is operable in a high impedance mode and a low impedance mode in response to circuit conditions in the high voltage electrical system. Means for isolating the current path in a failure condition of the means for providing are also provided. The means for isolating is coupled to the means for providing and is movable relative to the means to electrically disconnect the current path in the failure condition. Means for retaining the means for isolating proximate the means for providing in the failure condition is also provided.

While the invention has been described in terms of various specific embodiments, those skilled in the art will recognize that the invention can be practiced with modification within the spirit and scope of the claims.

What is claimed is:

1. A surge arrester assembly comprising:

a surge arrester;

a disconnector coupled to the surge arrester; and a retainer coupled to the disconnector and configured to constrain displacement of the disconnector relative to the surge arrester.

2. The assembly of claim 1, wherein the retainer is rigid.

3. The assembly of claim 1, wherein the retainer is flexible.

4. The assembly of claim 1, further comprising a hanger coupled to the arrester, wherein the retainer extends between the hanger and the disconnector.

5. The assembly of claim 1, wherein the surge arrester includes a housing, a portion of the retainer extending around the housing and interfering with the housing when the disconnector is activated.

6. The assembly of claim 1, wherein the surge arrester includes a housing, the retainer wrapped around the housing.

7. The assembly of claim 1, wherein the retainer is coupled to opposing ends of the disconnector.

8. The assembly of claim 1, wherein the surge arrester includes first and second terminal studs, the retainer extending between the first and second terminal studs.

9. The assembly of claim 1, wherein a terminal stud extends from the disconnector, and wherein the retainer is fastened to the disconnector via the terminal stud.

10. The assembly of claim 1, wherein the surge arrester includes a stack of components responsive to an over-voltage condition to shunt current to electrical ground, the components including at least one metal oxide varistor.

11. The assembly of claim 1, wherein the disconnector is detonated to mechanically sever an electrical connection to the surge arrester when the arrester fails.

12. The assembly of claim 1, wherein the retainer is tubular.

13. A surge arrester assembly comprising:

a high voltage surge arrester comprising first and second terminals;

a disconnector coupled to the surge arrester and configured to sever electrical connection to one of the terminals; and a retainer configured to limit axial displacement of the disconnector relative to the surge arrester.

14. The assembly of claim 13, further comprising a first terminal stud extending from the first terminal and a second terminal stud extending from the disconnector.

15. The assembly of claim 14, wherein the retainer is coupled to each of the first and second terminal studs.

16. The assembly of claim 13, wherein the retainer comprises a rigid wire form.

17. The assembly of claim 16, wherein the wire form comprises a section configured to nest around a terminal stud extending from the disconnector.

18. The assembly of claim 16, wherein the arrester comprises a hanger, the hanger defining an aperture therethrough, and the wire form extending through the aperture, the wire form comprising a hanger portion configured to resist being pulled through the aperture.

19. The assembly of claim 16, wherein the wire form comprises a hanger portion extending in a first plane, and a disconnector portion extending in a second plane, wherein the first and second planes are different from one another.

20. The assembly of claim 19, wherein the first and second planes are substantially perpendicular.

21. The assembly of claim 16, wherein the wire form comprises a housing portion extending around an outer periphery of the arrester, the housing portion dimensioned to interfere with the periphery of the arrester and prevent movement of the disconnector away from the arrester when activated.

22. The assembly of claim 13, wherein the retainer comprises a flexible strap, the strap being coupled to a first side of the disconnector.

23. The assembly of claim 22, further comprising a hanger extending from the arrester, the strap being coupled to the hanger and extending between the hanger and the disconnector.

24. The assembly of claim 22, wherein the disconnector comprises a second side opposite the first side, the strap being connected to the second side and extending between the first and second sides.

25. The assembly of claim 13, wherein the retainer is wrapped around the arrester.

26. The assembly of claim 13, wherein the disconnector comprises a charged powder.

27. A surge arrester assembly comprising:

a high voltage surge arrester defining a conductive path between first and second terminals, the current path exhibiting a high impedance during normal operating conditions and a low impedance during an over-voltage condition;

a disconnector coupled to the surge arrester and comprising a charged powder configured to be detonated, thereby severing electrical connection to one of the first and second terminals; and a retainer configured to limit movement of the disconnector relative to the surge arrester and preventing the disconnector from becoming a hazardous projectile if the disconnector detonates during shipping and storage of the arrester.

28. The assembly of claim 27, further comprising a first terminal stud extending from the first terminal and a second terminal stud extending from the disconnector, the retainer coupled to at least one of the terminal studs.

29. The assembly of claim 28, wherein the retainer is nested around one of the studs.

30. The assembly of claim 27, wherein the retainer is selected from the group of a wire form, a wire, and a strap.

31. The assembly of claim 27, wherein the arrester comprises a hanger, the retainer being coupled to the hanger.

32. The assembly of claim 27, wherein the retainer extends around an outer periphery of the arrester, the retainer dimensioned to interfere with the periphery of the arrester and prevent movement of the disconnector away from the arrester when activated.

33. The assembly of claim 27, wherein the retainer is flexible.

34. The assembly of claim 27, wherein the disconnector comprises opposing sides, the retainer being coupled to the disconnector proximate each of the opposing sides.

35. The assembly of claim 27, wherein the retainer is wrapped around the arrester.

36. A method of packaging a high voltage surge arrester for storage or transport, the method comprising:

providing a high voltage surge arrester defining a conductive path between first and second terminals, the current path exhibiting a high impedance during normal operating conditions and a low impedance during an over-voltage condition, the arrester including a disconnector adapted to break electrical connection through the arrester in a failure condition;

providing a retainer adapted to limit displacement of the disconnector relative to the arrester; and installing the retainer to the disconnector, whereby the disconnector is prevented from becoming a hazardous projectile during transit and storage.

37. The method of claim 36, wherein installing the retainer is performed at one of a packing site, a manufacturing or distributing facility, or at the site of installation of the arrester to a high voltage electrical power system.

38. The method of claim 36 wherein installing the retainer comprises retrofitting an arrester with the retainer.

39. The method of claim 36, wherein providing the retainer comprises providing a plurality of differently configured retainers.

40. A high voltage arrester assembly comprising:

means for providing over-voltage protection to a high voltage electrical system, the means for providing establishing a current path to electrical ground in an over-voltage condition, the current path operable in a high impedance mode and a low impedance mode in response to circuit conditions in the high voltage electrical system;

means for isolating the current path in a failure condition of the means for providing, the means for isolating coupled to the means for providing and being movable relative to the means to electrically disconnect the current path in the failure condition; and means for retaining the means for isolating proximate the means for providing in the failure condition.

* * * * *